United States Patent
Lee et al.

(10) Patent No.: US 9,645,697 B2
(45) Date of Patent: May 9, 2017

(54) TRANSLATING EVENTS IN A USER INTERFACE

(71) Applicant: Cyberlink Corp., Shindian, Taipei (TW)

(72) Inventors: Hsin-Wei Lee, Shindian (TW); Shang-Jung Chuang, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 449 days.

(21) Appl. No.: 13/689,226

(22) Filed: Nov. 29, 2012

(65) Prior Publication Data

US 2013/0091466 A1    Apr. 11, 2013

Related U.S. Application Data

(63) Continuation of application No. 12/333,372, filed on Dec. 12, 2008, now Pat. No. 8,341,552.

(51) Int. Cl.
*G06F 3/048* (2013.01)
*G06F 3/0482* (2013.01)
*G06F 9/445* (2006.01)

(52) U.S. Cl.
CPC ........... *G06F 3/048* (2013.01); *G06F 3/0482* (2013.01); *G06F 8/61* (2013.01)

(58) Field of Classification Search
CPC ................. H04N 21/4622; H04N 5/44543
See application file for complete search history.

(56) References Cited

U.S. PATENT DOCUMENTS

| | | | |
|---|---|---|---|
| 6,182,287 B1* | 1/2001 | Schneidewend et al. | 725/48 |
| 2004/0034583 A1 | 2/2004 | Lanier et al. | |
| 2004/0034853 A1* | 2/2004 | Gibbons et al. | 717/174 |
| 2005/0076308 A1* | 4/2005 | Mansell et al. | 715/811 |
| 2006/0282794 A1* | 12/2006 | Chen et al. | 715/825 |
| 2009/0019394 A1* | 1/2009 | Sekimoto | H04N 5/44543 715/811 |

* cited by examiner

*Primary Examiner* — Ayesha Huertas Torres
(74) *Attorney, Agent, or Firm* — McClure, Qualey & Rodack, LLP

(57) ABSTRACT

Systems and methods for translating events in a high definition video playback system are disclosed. A disc viewer is configured to read at least one user interactive program on a high definition optical disc defining an original menu of a user interface. The user interface defines a plurality of event handlers for user interaction with the user interface. An express menu renderer is configured to generate a menu populated with a plurality of selectable elements that are responsive to interaction with a mouse and/or pointing device. The selectable elements correspond to user interactive features of the user interface and have a corresponding visual identifier.

27 Claims, 12 Drawing Sheets

TRANSLATING EVENTS IN A USER INTERFACE

This is a continuation application of U.S. application Ser. No. 12/333,372 filed on Dec. 12, 2008, the disclosure of which is incorporated herein by reference in its entirety.

TECHNICAL FIELD

The present disclosure generally relates to translating events in a user interface displayed in a high definition video playback system.

BACKGROUND

There are a variety of standards governing the format and/or other attributes of high definition video. For example, Blu-ray Disc (BD) is a popular optical disc storage media format that is employed for high definition video and data storage. Blu-ray Disc Java (BD-J) is a development platform that allows content authors to create and incorporate interactive functionality into a Blu-ray Disc. For example, a content author can incorporate in a user interactive program on a Blu-ray Disc various user interactive menus, games, and other functionality that can be supported by the BD-J specification. To this end, a content author may define and/or implement various events and event handlers that allow a user to interact with the user interactive program.

SUMMARY

Included are embodiments for translating user input in a high definition video playback system. At least one embodiment of a method includes a method for generating an express menu from a high definition optical disc in a high definition playback system, the high definition optical disc storing an original menu populated with a plurality of user interface elements in a user interface. The method includes reading a user interactive program stored on the high definition optical disc, the user interactive program defining the user interface and the original menu. The method can further include generating the express menu associated with the high definition optical disc, the express menu generated according to the original menu and populated with at least one selectable element, each selectable element corresponding to at least one of the user interface elements. The method can also include saving the express menu for future playback, wherein the express menu is responsive to at least one of: a mouse and a pointing device.

Also included are embodiments of a system. Some embodiments include a system for generating an express menu from a high definition optical disc in a high definition playback system, the high definition optical disc storing an original menu populated with a plurality of user interface elements in a user interface responsive to a keyboard or remote control. The system can include a disc viewer configured to read a user interactive program stored on the high definition optical disc, the user interactive program defining the user interface and the original menu for user interaction. The system can also include an express menu renderer configured to generate the express menu associated with the high definition optical disc and to save the express menu for future playback, the menu generated according to the original menu and populated with at least one selectable element, each selectable element corresponding to at least one of the user interface elements, where the express menu is responsive to a mouse or a pointing device.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
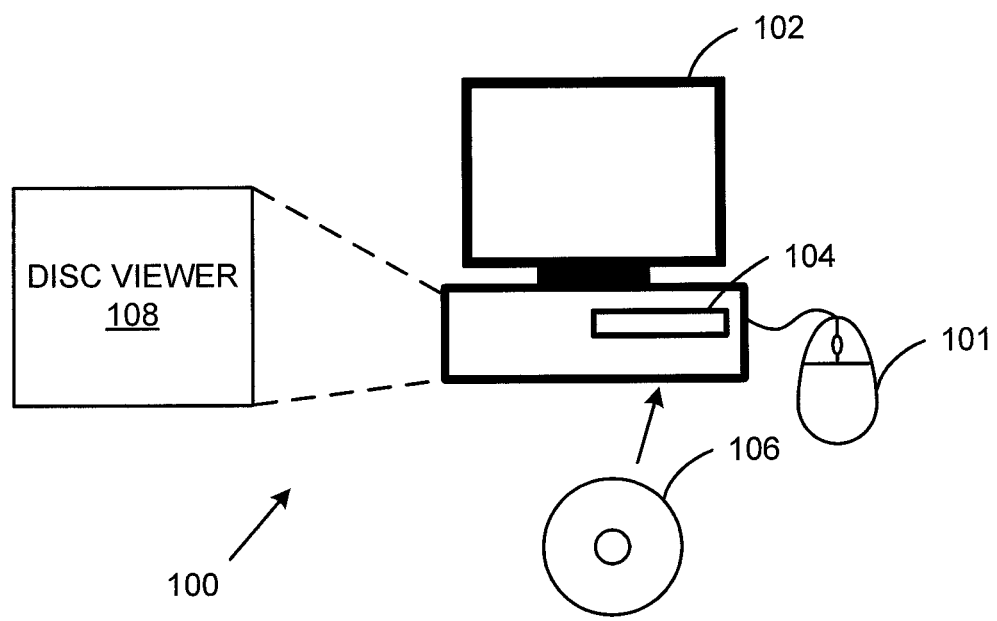
FIG. 1 depicts an exemplary embodiment of a high definition video playback system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Blu-ray Disc (BD) is one example of an optical storage media format that is employed for storage and/or playback of high definition video. In conjunction with the storage and/or playback of high definition video, a content author may provide one or more user interactive programs containing user interactive features such as menus, widgets or other user interface elements that are executable by a BD player device or BD player software. Such user interactive features allow a user to interact with software residing on a BD disc and executed by a BD player to enhance the viewing experience.

To this end, an author of content stored on a BD disc can define events and event handlers corresponding to a particular layout or other user interface component to create such a user interactive experience. As a non-limiting example, a content author can define a button and/or menu that respond to user input from a keyboard or remote control. In other words, the user interface can respond to or handle an "event" caused by user input. As a non-limiting example, such an event can include a mouse or keyboard input, selection of a user interface element, or other similar event.

Accordingly, the user interface can define one or more event handlers that execute in response to certain events. Such an event handler can alter a presently displayed user interface, display other user interface components and/or other content stored on the disc. However, in a personal computing environment, a user may wish to interact with such a user interface using an input device other than a keyboard or remote control.

As a non-limiting example, the user may wish to interact with the user interface using a pointing device. Accordingly, the present disclosure provides systems and methods for generating an additional user interface component or "express menu" with which a user may interact to cause event handlers to alter the user interface and/or cause new user interface components or other content to be displayed. Such an express menu can be overlaid onto a user interface defined by a user interactive program stored on a high definition optical disc and allow the user to interact with the user interface in a high definition video playback system used for playback of Blu-ray Discs or other high definition video sources.

As a non-limiting example, a user may activate an express menu mode that causes an express menu to be displayed and/or overlaid on the user interface. The generated express menu can be populated with selectable elements and/or visual identifiers corresponding to all or substantially all user interactive components displayed in a user interface in menu form. Accordingly, a user may interact with items within the express menu in order to cause events to be triggered and corresponding event handlers defined by the user interface to be executed. Such an express menu mode can facilitate interaction with the user interface with a mouse or other pointing device, as a user may wish to use such a device rather than a keyboard or remote control device.

Reference is now made to FIG. 1, which depicts an embodiment of a high definition video playback system 100. As illustrated in the non-limiting example of FIG. 1, the high definition video playback system 100 may include one or more user input devices such as a keyboard, mouse 101, and/or other pointing device. The high definition video playback system 100 may also include a display 102 and high definition disc reader 104 capable of reading and/or decoding data stored within a high definition disc 106. The high definition video playback system 100 may be any type of computer system configured to receive input from a user such as a personal computer or a laptop or a digital home television, for example. Rather than a multi-purpose personal computer and/or laptop computer, the high definition playback system 100 may also include a display or television coupled to a specialized high definition optical disc player.

User interactive content may be received by the high definition video playback system 100 via the high definition disc reader 104 from a high definition disc 106 that can include, but is not limited to, an optical storage medium such as a Blu-ray Disc (BD) or HD-DVD. Alternatively, the system 100 can receive user interactive content from other sources, including, but not limited to, internal mass storage, a local area network, wide area network such as the Internet, cable television service, over-the-air television service, satellite television service, or other content sources as should be appreciated. The system 100 can render or display user interactive content and high definition video sources via a disc viewer 108, which can execute and/or display to a user via the display 102 a user interface encoded therein.

The disc viewer 108 can be implemented as a software program configured to play, read and/or view a high definition disc 106 or other high definition video source according to the specifications defined by standards such as the Blu-ray Disc format specification. The disc viewer 108 can also be implemented as a software program residing in the memory, mass storage, a high definition disc 106, a network location, or other location as should be appreciated.

In operation, once a high definition disc 106 or other video source is received by the disc viewer 108, the disc viewer 108 can execute and/or render one or more user interactive programs residing on the high definition disc 106 or video source. Such a user interactive program can include, but is not limited to, a movie introductory menu or other menus and user interactive features allowing a user to enhance, configure, and/or alter the viewing experience, choose playback configuration options, select chapters to view within the high definition disc 106, in-movie user interactive features, games, or other features as should be appreciated.

Figure 2:
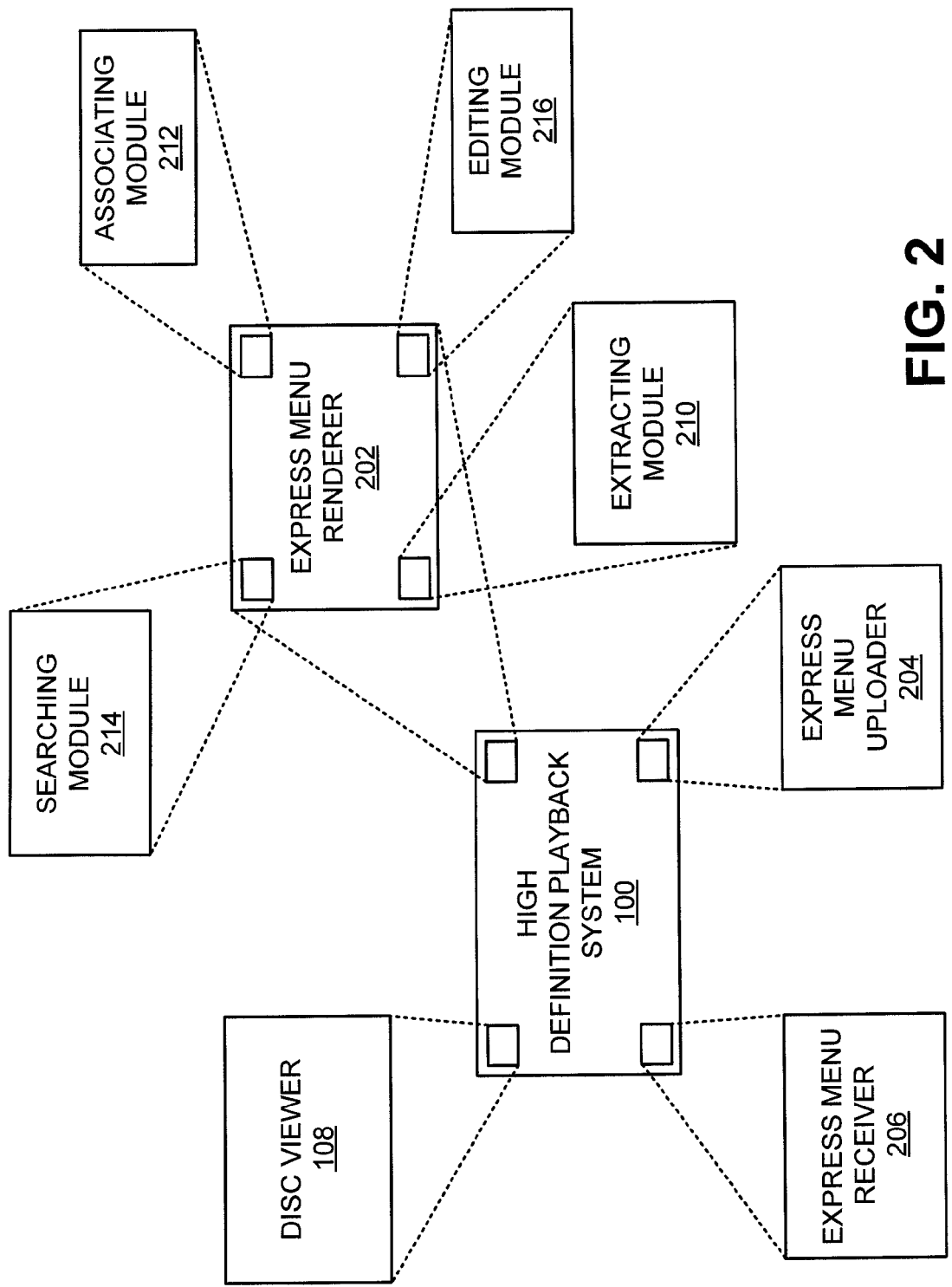
FIG. 2 depicts a functional block diagram of the high definition video playback system of FIG. 1.

Reference is now made to FIG. 2, which depicts a functional block diagram of a high definition video playback system 100 and an exemplary embodiment of a disc viewer 108. It should be noted that some components not essential for understanding (by persons skilled in the art) of the high definition video playback system 100 and/or disc viewer 108 are omitted for purposes of brevity and ease of depiction. As noted above, a disc viewer 108 can be implemented as a software program that is but one component of a high definition video playback system 100.

The high definition playback system 100 can include an express menu renderer 202, which can generate an express menu by extracting via the extracting module 210 one or more user interface elements from code defining an original menu from a user interactive program in a high definition video source such as a high definition disc 106 or BD disc. The original menu can include various user interface elements displayed on a screen when viewing user interactive features on a high definition optical disc. A user interactive program on a high definition optical disc populates an original menu with user interface elements associated with event handlers and/or other software elements defined by the user interactive program. Such a user interface created by a content author for a high definition disc can instruct the disc viewer 108 how to display user interface elements to a user via a display or other means as well as how to handle user input from a user. In other words, user interface elements can be defined that are responsive to user input. Therefore, code defining the user interface may define event handlers that can be executed in response to a user triggering an event associated with the various user interface elements. For example, the user interface may specify a response to an event, which could be the selection of a particular user interface element by the user. The response can take the form of an event handler, such as, whether it includes display of an additional user interface element, menus, images, video, video content, and other elements on the display 102.

Accordingly, the express menu renderer 202 can extract events and/or event handlers via extracting module 210 that are associated with user interactive content in a user interface by the associating module 212 in order to populate a generated express menu that may differ from an original menu defined on a high definition optical disc. The extracting module 210 can also cause extracted event handlers to be stored in an event pool in a buffer, memory, and/or other storage for to facilitate retrieval by other modules in the express menu renderer 202 or the renderer 202 itself. The express menu renderer 202 can be configured to extract event handlers that are associated with user interface elements from code and/or markup language defining the original menu, user interface and/or user interactive program.

As a non-limiting example, the renderer 202 can extract an event handler and generate a selectable element and/or visual identifier associated therewith for an express menu. As noted above, the renderer 202 can extract the event handler from code defining the user interface that is associated with a particular event, such as selection of a displayed button. As an additional non-limiting example, the original menu on the optical disc defines an "audio language" button, a "subtitle language" button and various buttons to change the settings of video/audio playback and a "setup" button for the higher hierarchical for those buttons. If the user wants to change the language of the subtitle as English characters, he needs to trigger the "setup" button. The event handler corresponding to the "setup" button is executed to display the lower hierarchical buttons. Further, the user can trigger the "subtitle language" button, and the event handler corresponding to the "subtitle language" will be executed for choosing "English characters" as the desired setting of the subtitle playback. The renderer 202 can identify an event handler associated with one or more user interface elements, such as the "setup" button and others defined in the original menu. The renderer 202 populates an express menu with a selectable element that, when selected by a user, can trigger an event handler defined by the user interface that is likewise associated with the "setup" button.

The renderer 202 can further extract via the extracting module 210 a textual and/or graphical label from code defining a user interface and associate it with a visual identifier corresponding to a selectable element in a generated express menu. As a non-limiting example, the renderer 202 can identify an event handler associated with one or more user interface elements associated with a "setup" button, and extract a textual label from code defining a user interface and/or user interactive program associated with such an event handler. The renderer 202 can further populate an express menu item with a selectable element having such an extracted textual identifier. As an additional non-limiting example, the renderer 202 can extract an image and/or video associated with a "setup" button from code or layout defining the user interface. The renderer 202 can then generate a graphical identifier incorporating the extracted image and/or video associated with a selectable element in the express menu that is associated with the "setup" button.

An express menu generated by the renderer 202 and overlaid onto a user interface defined by a user interactive program of a high definition optical disc can also be modified by a user according to preferences and/or desires of the user. As a non-limiting example, the renderer 202 may generate an express menu overlaid onto the user interface by extracting events and/or event handlers in the order in which they appear in the code defining the user interface. Accordingly, the renderer 202 may generate selectable elements in an express menu corresponding to the events and/or event handlers in the same or similar order. A user may wish to modify the order in which selectable elements appear in the express menu. As an additional non-limiting example, the user may wish to alter visual identifiers associated with selectable elements in an express menu that are generated by the renderer 202. The user may with to alter an exemplary "setup" textual label associated with a selectable element by changing the label to a different textual label or even a graphical label.

In addition, a user may associate via the associating module 212 more than one event handler defined by a user interactive program with a selectable element in an express menu. As a non-limiting example, a user may define a language selectable element in an express menu that not only alters an audio language setting, but also alters a subtitle language setting. As an additional non-limiting example, a user may define an audio-video quality selectable element in an express menu that not only alters video setup of a high definition optical disc, but audio setup as well. Such selectable elements in an express menu can allow a user to perform multiple tasks with the selection of a single express menu element. As an additional non-limiting example, the selectable element "language" of the express menu is to execute the event handler corresponding to the "audio language" button and the event handler corresponding to the "subtitle language" button. The user selects the selectable element "language", the event handles corresponding to the "audio language" and the "subtitle language" is be executed regardless the event handler corresponding to the "setup" button. Such that, the user would change the settings of audio/subtitle, which are corresponding to two or more buttons in the original menu, via the selection of one selection element of the express menu.

Accordingly, the high definition playback system 100 can further include an express menu uploader 204 configured to upload a generated and/or altered express menu to one or more servers or other high definition playback system, personal computers or other networked device. The uploaded express menu can further be indexed by content stored on the high definition optical disc. In addition, the express menu uploader 204 can store an express menu on storage and/or memory within the high definition playback system 100 and index the express menu according to content stored on the high definition optical disc. As noted above, a generated express menu may be configured to be altered by a user by manipulating the user interface. Accordingly, the express menu uploader 204 can upload an altered menu to a server, computer, or other networked system configured to store the altered menu for retrieval by other users via a network.

Therefore, as a non-limiting example, a user may view content on a high definition optical disc using the high definition playback system 100 and the express menu can be located by the searching module 214 and then downloaded from a server by the express menu receiver 206. The downloaded express menu may be overlaid onto the user interface. In addition, an express menu can be received by the express menu receiver 206 by reader from a local memory, mass storage, and/or the high definition optical disc itself. If there exist multiple versions of altered express menus that are stored on a server, then the user may choose a desired express menu by a number of variables which can include, but are not limited to, popularity, age, user rating, accuracy, and other variables that should be appreciated. Alternatively, a user may further alter a downloaded express menu which can be subsequently uploaded to a server. In this way, a user may avoid having to alter an express menu to suit particular desires and/or preferences by relying on an express menu configuration stored on a server or personal computer. Further, a server or other networked device can maintain a database and/or data store of express menu configurations submitted by various users connected to a network that can be shared with other users similarly connected. Additionally, the editing module 216 can allow a user to edit an express menu, which can be saved by the express menu uploader 204.

The express menu renderer 202 can further disable and/or suppress an express menu during certain portions of playback of a high definition optical or execution of a user interactive program on a high definition optical disc. It should be appreciated that a content author may desire to suppress certain user interactive functionality during certain portions of playback of, for example, a movie. Accordingly, in one non-limiting example, the express menu renderer 202 can disable certain selectable elements during certain portions of playback of a high definition optical disc. Additionally, the express menu renderer 202 can disable rendering of an express menu altogether during certain portions of playback if user interactive functionality is disabled by the content author.

As a non-limiting example, may theatrical high definition optical discs can contain an anti-piracy warning during which user interactive functionality can be disabled. Accordingly, the express menu renderer 202 can disable selectable elements of an express menu as well as disable rendering of the express menu during playback of the anti-piracy warning. Other examples and scenarios in which selectable elements of an express menu and/or rendering of the express menu may be disabled should be appreciated. The express menu renderer 202 can therefore actively or passively determine the playback status of a high definition optical disc in order to determine whether to disable selectable elements or the express menu. In one embodiment, the express menu renderer 202 can actively query the disc viewer 108 regarding the playback status of a high definition optical disc to determine whether disabling and/or suppression of the express menu is desired. As an alternative example, the express menu renderer 202 can passively receive playback status data from the disc viewer 108 to determine whether disabling and/or suppression of the express menu is desired.

Figure 3:
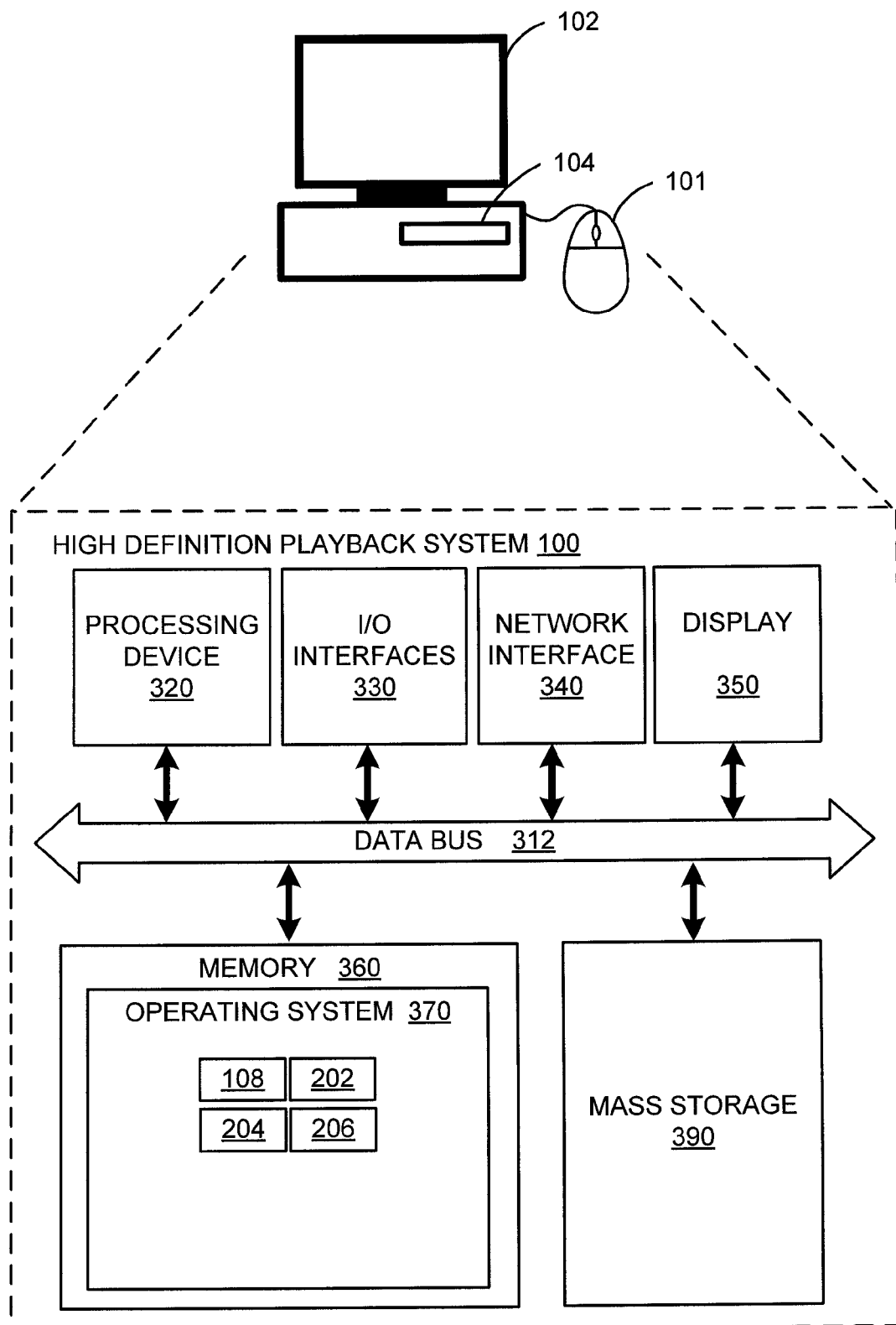
FIG. 3 depicts an alternative illustration of the high definition video playback system of FIG. 1.

Reference is now made to FIG. 3, which is an exemplary embodiment of the high definition video playback system 100 from FIG. 1. For some embodiments, the high definition video playback system 100 may be incorporated as some type of computing device. Generally speaking, the high definition video playback system 100 may be any one of a wide variety of wired and/or wireless computing devices, such as a desktop computer, portable computer, dedicated server computer, multiprocessor computing device and so forth. Irrespective of its specific arrangement, the high definition video playback system 100 may comprise, among other components, a processing device 320, input/output interfaces 320, a network interface 340, and a display 102 connected across a data bus 312. One of ordinary skill in the art will appreciate that the high definition video playback system 100 can, and typically will, comprise other components, which have been omitted for purposes of brevity.

The display 102 can comprise a computer monitor or a plasma screen for a PC or a liquid crystal display (LCD), for example. The processing device 320 can include a custom-made or commercially available processor, a central processing unit (CPU) or an auxiliary processor among several processors associated with the video viewing device 310, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 360 shown in FIG. 3 can include any one of a combination of volatile memory elements (e.g., random-access memory RAM, such as DRAM, and SRAM, etc.) and nonvolatile memory elements (e.g., ROM, hard drive, tape, CDROM, etc.). The memory 360 may store a native operating system 370, one or more native applications, emulation systems, or emulated applications for any of a variety of operating systems and/or emulated hardware platforms, emulated operating systems, etc. For example, the applications may include the disc viewer 108. Again, one of ordinary skill in the art will appreciate that the memory 360 can, and typically will, comprise other components, which have been omitted for purposes of brevity. The high definition video playback system 100 may further comprise mass storage 390. The mass storage 390 may be, for example, a disk drive, flash memory, or any other of a wide variety of storage devices capable of storing data.

The disc viewer 108 shown in FIG. 2 may be a high definition video software player application used for playing various disc formats such as DVD, HD-DVD, Blu-ray discs, as well as video retrieved from mass storage 390. As noted in FIG. 2, the high definition playback system 100 may include an express menu renderer 202, an express menu uploader 204, and/or an express menu receiver 206. When implemented in software, it should be noted that any of the above modules can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Input/output interfaces 330 comprise any number of interfaces for the input and output of data. For example, where the high definition video playback system 100 comprises a personal computer, the components within the system may interface with a user input device such as a keyboard, a mouse, or a remote controller. The high definition video playback system 100 may also include a network interface 340 for transmitting and/or receiving data over a network such as video content. As a non-limiting example, the network interface 340 may include a modulator/demodulator (e.g., a modem), wireless (e.g., radio frequency (RF)) transceiver, a telephonic interface, a bridge, a router, network card, etc.

Figure 4:
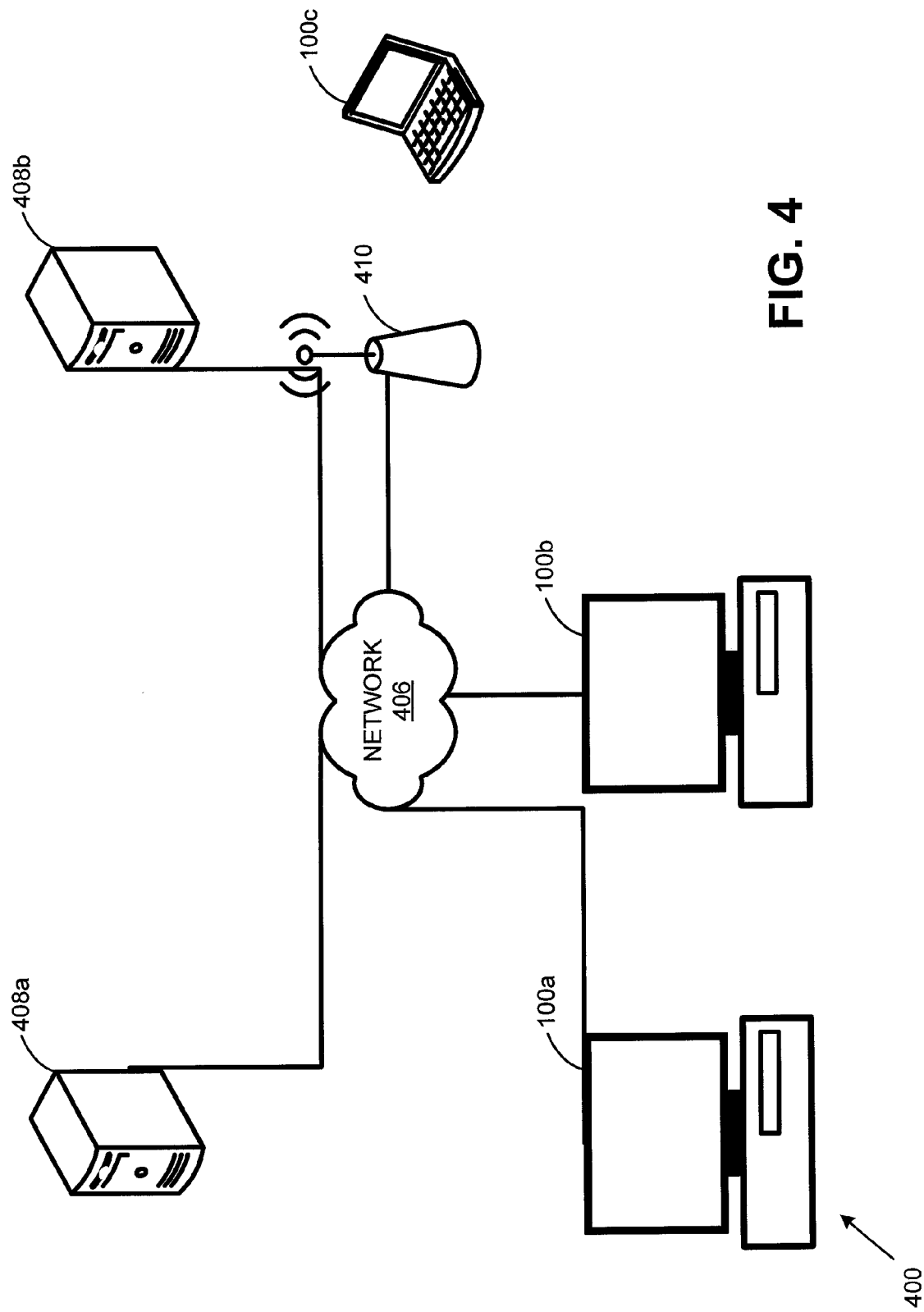
FIG. 4 depicts a networked environment including the high definition video playback system of FIG. 1

Reference is now made to FIG. 4, which depicts a non-limiting networked environment 400 including at least one high definition playback system coupled to a network via a network interface. The depicted environment further includes at least one server also coupled to the network 406 via a network interface. In the depicted networked environment, a high definition playback system 100 can upload and/or download an express menu via the network 406 by communicating with at least one server 408 configured to store express menu data.

An express menu can be stored on a server and indexed by data regarding a high definition optical disc. As a non-limiting example, the express menu can be indexed by a title, running time, or other such identifying or fingerprinting data of high definition video and/or a high definition optical disc. The express menu can further be stored on a server indexed by a hash code calculated from data on the high definition optical disc. Such identifying information can include, but is not limited to: a movie title, a tagline, a year of release, a genre, a cast, a director, chapter information, title information, video attributes, audio attributes, and other disc attributes. In addition, the express menu can be stored without identifying data as a general purpose express menu that can be used when viewing any high definition optical disc.

The networked environment 100 can further include a high definition playback system 100c coupled to the network 406 by a router 410 or other port forwarding and/or routing device. The depicted servers 408 can allow a user of a high definition playback system 100 to download an express menu configuration stored thereon. Accordingly, a user may utilize an express menu configuration stored on a server 408 that differs from an express menu generated by the express menu renderer 202 on the user's high definition playback system. In this way, a user may take advantage of various express menu configurations created by other users and uploaded to a server 100 by their respective express menu uploaders 204, thereby taking advantage of an edited express menu without having to edit an express menu on the user's high definition playback system 100.

Figure 5A:
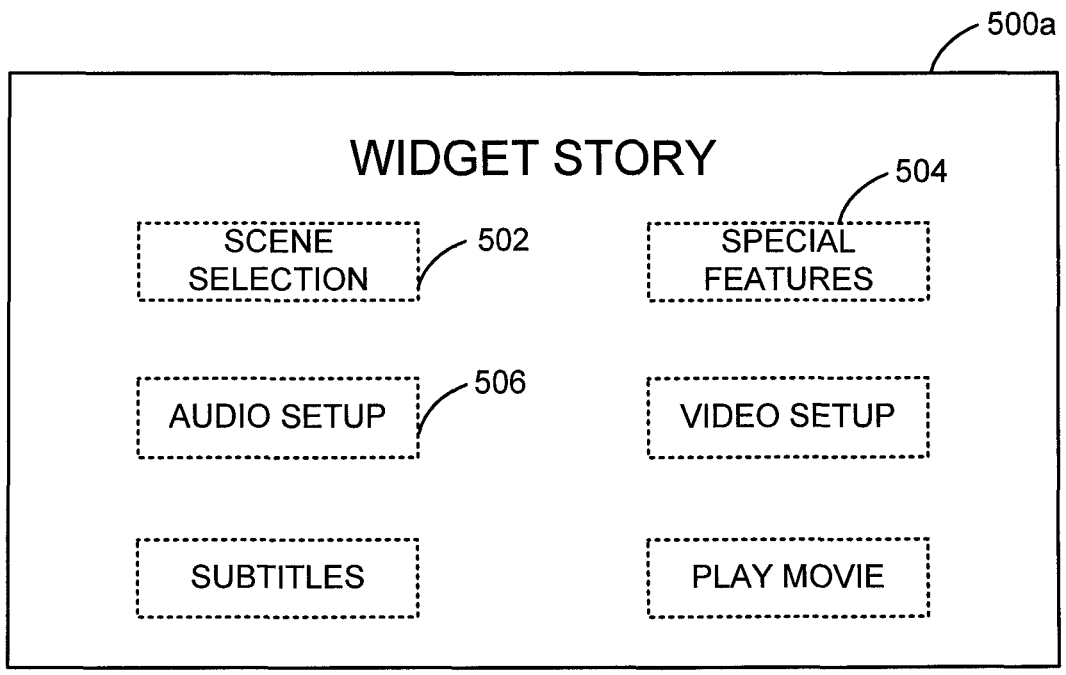
FIG. 5A depicts an exemplary user interface defined by a user interactive program in a high definition video playback system.
Figure 5B:
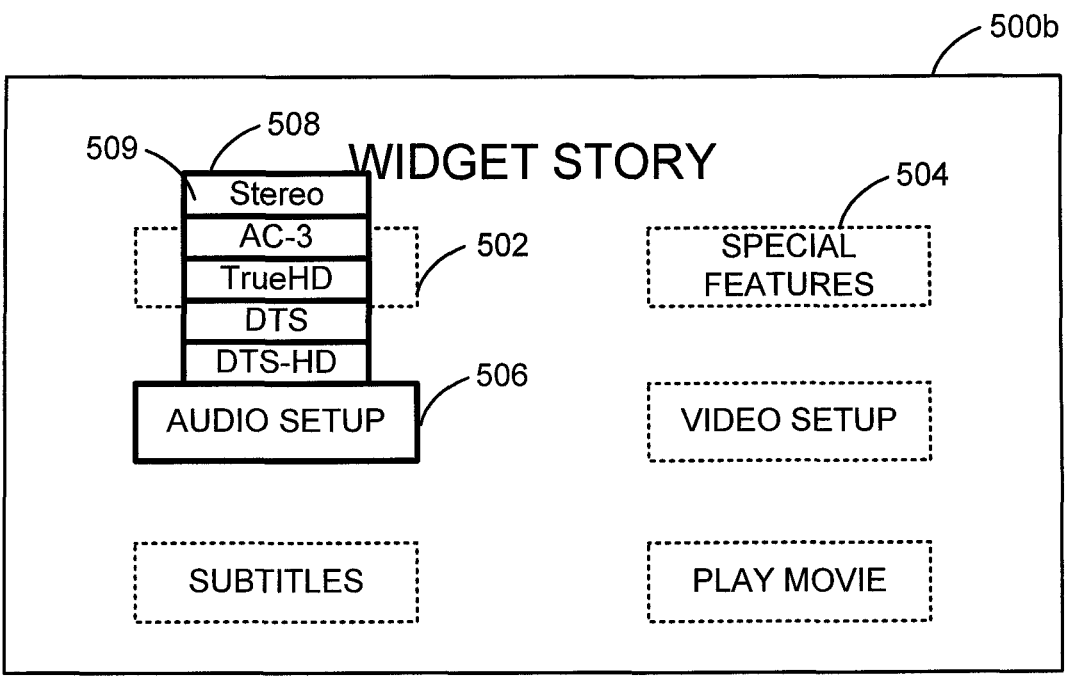
FIG. 5B depicts an alternative illustration of the exemplary user interface of FIG. 4A.

Reference is now made to FIGS. 5A and 5B, which depict a non-limiting exemplary user interface 500a, 500b that can be defined by a user interactive program on a high definition disc such as a BD disc. The depicted user interface 500 can be rendered by the high definition video playback system 100 of FIGS. 1-3 on a display, television or other device employed by a user. In the depicted user interface 500, there are a number of user interface elements, such as scene element 502, features element 504, and audio setup element 506. The depicted exemplary elements 502, 504, 506 are selectable, as they can be selected by a user to cause further interaction with a user interactive program of a high definition disc.

In other words, in one non-limiting example, the user interface elements 502, 504, 506 can be triggered by an event and cause one or more event handlers to execute, which can further cause additional user interface elements to be rendered other content to be displayed, or other response that can be defined by the user interactive program. In other words, a content author may define one or more events that a user interface element can be responsive to, such as, a pointing device input, keyboard input, or other executed software code defined in the user interactive program. A content author may additionally define one or more event handlers corresponding to user interface elements that can execute in response to an event that is triggered.

As a non-limiting example, if a user selects the depicted scene element 502 of FIG. 5A by manipulating a keyboard or remote control, events and/or event handlers specified by code defining the user interface can cause additional content, menus, video, images to be rendered. Additionally, events and/or event handlers specified by code defining the user interface can further cause additional and other events or event handlers defined by the user interface to be triggered. In one example, a screen depicting user interface elements allowing a user to select a scene of content on a high definition optical disc can be displayed. Alternatively, if a user selects special features scene 504, event handlers can cause an additional user interface screen to be rendered providing a user with additional user interface elements for selecting special features of a high definition optical disc.

Reference is now made to FIG. 5B, which depicts an alternative illustration of the user interface 500a of FIG. 5A. In the non-limiting example of FIG. 5B, audio setup element 506 is shown upon selection by a user via a keyboard or remote control. In response to such an event, an event handler specified by code defining the user interface 500b and/or user interactive program causes additional user interface elements to be rendered. In the depicted example, popup audio menu 508 is rendered, which includes additional user interface elements with which a user may interact. As noted above, an event handler defined by a user interactive program can trigger additional events and/or event handlers. Accordingly, in the depicted non-limiting example, popup audio menu 508 can provide additional user interface menu elements that can be responsive to additional events trigger by user input. As a non-limiting example, a user can select stereo user interface element 509, which can cause an event handler to be triggered that in turn causes an audio track and/or audio program of the high definition optical disc that corresponds to thereto to be selected. Additionally, if a user again selects audio setup element 506, an event handler can cause the popup audio menu 508 to be collapsed.

With reference to the above examples, it should be appreciated that the user interface defined by a user interactive program can define various responses, events and/or event handlers to any input on a keyboard or remote control. As a non-limiting example, a user interactive program can define that any user interface element can be selected and/or manipulated by a user by depressing various keys or causing various user inputs.

Figure 6A:
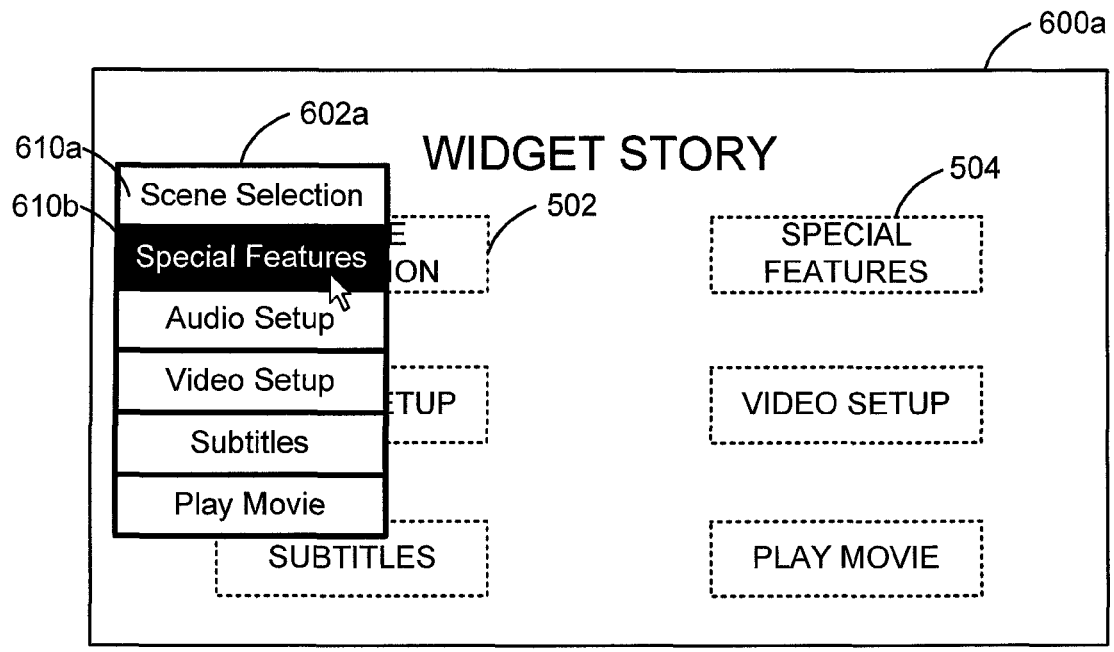
FIG. 6A depicts operation of a disc viewer in accordance with a high definition video playback system.

Reference is now made the FIG. 6A, which depicts one example of operation of the express menu renderer 202 (FIG. 2). As noted above, a content author of high definition video content such as a BD disc may define a user interactive program that further defines a user interface using various code and/or markup language. As a non-limiting example, a content author may define a user interactive program on a BD disc with the BD-J language. Accordingly, the express menu renderer 202 can extract from such code and/or markup language information corresponding to events and/or event handlers in order to populate an express menu 602a. The depicted user interface 600a corresponds to the above illustrated non-limiting example of user interface 500a (FIG. 5), and the operation of an express menu renderer 202 therein.

In the depicted example, a user may activate an express menu mode, which causes the express menu renderer 202 to generate and overlay onto the user interface 600a an express menu 602a. As noted above, the express menu renderer 202 can extract events and/or event handlers from code defining the user interface in order to populate the menu 602 with selectable elements 610. The express menu renderer 202 can extract events and/or event handlers which are responsive to user input. Such user input can be received via a keyboard, pointing device, remote control device, voice-activated input, motion-sensitive input, or other input device. As a non-limiting example, a user can activate an express menu mode by selecting a menu element from a title-bar menu generated by the high definition playback system 100 (FIG. 1).

In the depicted non-limiting express menu 602a, the express menu renderer 202 populates the express menu 602a with selectable elements extracted from the various selectable user interface elements defined by the user interactive program and/or user interface. Accordingly, the express menu renderer 202 also extracts a textual and/or visual identifier associated with the selectable user interface elements defined by the user interactive program that it can apply to selectable elements populated in an express menu. As a non-limiting example, the depicted menu 602a includes selectable elements 610 corresponding to the various user interface elements defined by a user interactive program on a high definition optical disc. The express menu renderer 202 populates the menu 602a with a selectable scene selection menu item 610a corresponding to scene selection element 502. Likewise, the express menu renderer populates the menu 602a with a selectable special features menu item 610b corresponding to special features element 504, and so forth for additional user interface elements that are responsive to user input.

Upon activation of an express menu mode, the depicted non-limiting express menu 602a is responsive to user input via various user input devices as noted above. In the non-limiting illustration of FIG. 6A, the express menu 602a is responsive to pointing device input, and a user may select various menu items 610 by manipulating a pointing device and its buttons.

Figure 6B:
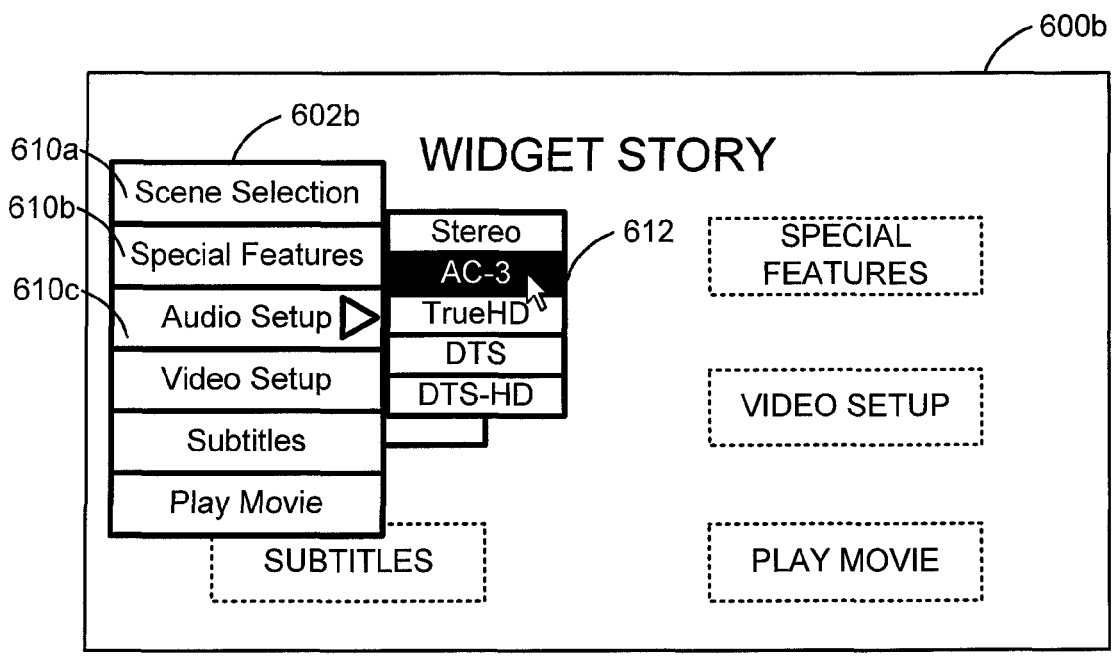
FIG. 6B depicts an alternative illustration of operation of a disc viewer in accordance with a high definition video playback system.

Reference is now made the FIG. 6B, which depicts an additional example of operation of the express menu renderer 202 (FIG. 2). In depicted user interface 600b an express menu mode has been activated which causes an express menu 602b to be generated and overlaid onto the user interface 600b. The depicted user interface 600b corresponds to the above non-limiting example of user interface 500b (FIG. 5). In the depicted non-limiting example, audio setup menu item 610c is selected by a user, which causes a nested audio menu 612 to be generated that corresponds to the above popup audio menu 508 (FIG. 5). Accordingly, the express menu renderer 202 is configured to generated nested menus that correspond to popup menus or nested menus defined by the user interactive program of a high definition optical disc. Additionally, if an event corresponding to an event handler causes user interface elements such as an additional menu to be generated, such nested menus can be utilized.

Figure 6C:
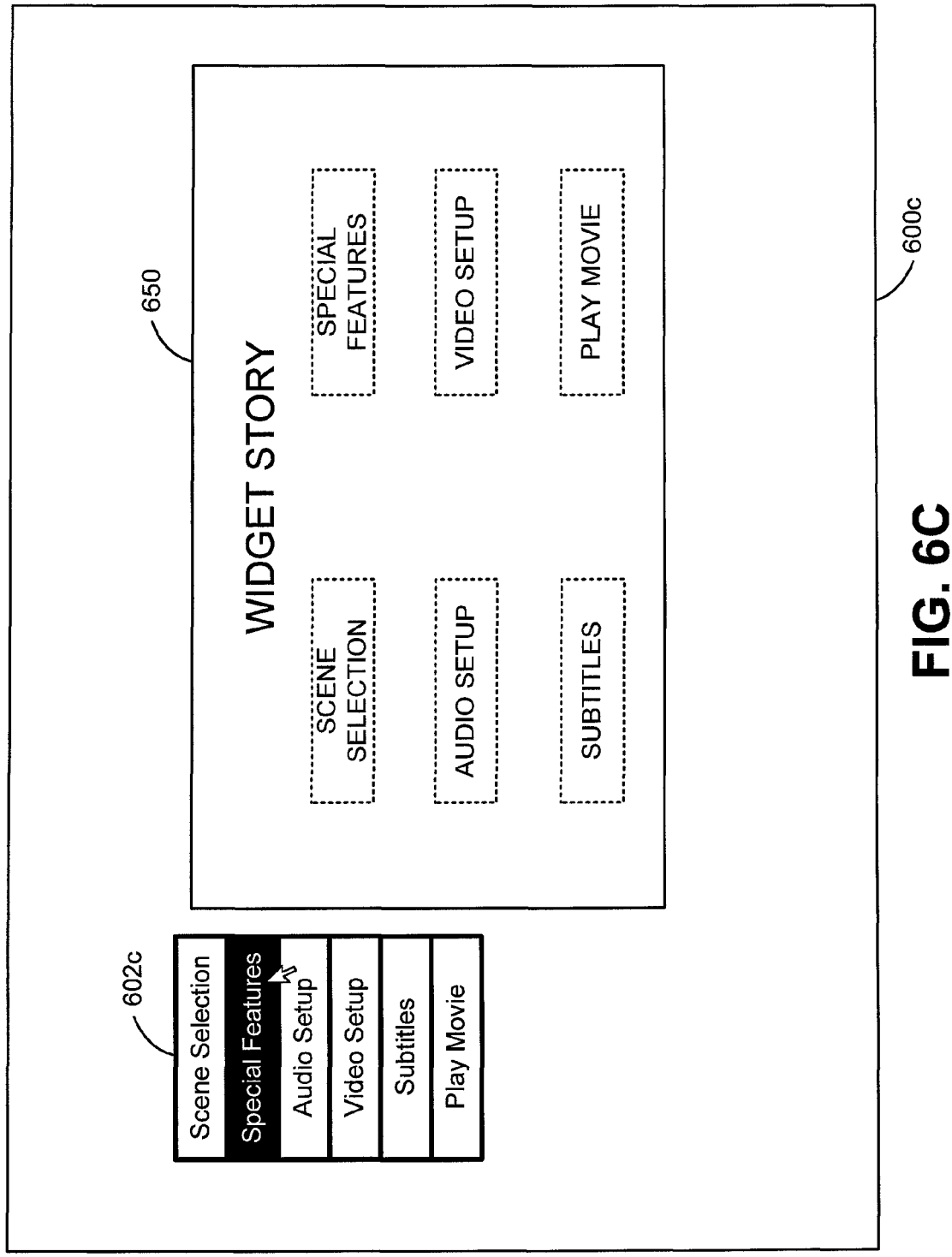
FIG. 6C depicts an alternative illustration of operation of a disc viewer in accordance with a high definition video playback system.

Reference is now made to FIG. 6C, which depicts an additional non-limiting example of operation of the express menu renderer 202 (FIG. 2). In the depicted user interface 600c, video content of a high definition disc can be rendered in a video window 650. Accordingly, the express menu render 202 can render an express menu 602c in various locations relative to the video window 650. In other words, the express menu 602c may not be overlaid onto video content of a high definition disc. The location of the express menu 602c can be configured by a user and/or predefined by the disc viewer 108 (FIG. 2) or express menu renderer 202. Additionally, the disc viewer 108 can render an express menu 602c and resize the video window 650 when an express menu mode is activated by a user. Upon selection or an express menu selectable element or upon deactivation of an express menu mode, the disc viewer 108 and/or express menu renderer 202 can remove the express menu 602c from view and/or maximize or enlarge the video window 650 within the user interface 600c.

Reference is now made to FIG. 7, which depicts an example of operation of the express menu renderer 202 (FIG. 2) as well as the express menu uploader 204 (FIG. 2). As noted above, the express menu uploader can allow a user to alter an express menu 702 generated by the express menu renderer 202, which can in turn be uploaded to a server or computer via a network or stored on mass storage or other memory of a high definition playback system 100. Additionally, an altered express menu 702 can be stored on the high definition optical disc. Because the express menu renderer 202 extracts selectable elements for a generated express menu 702 by accessing source code and/or markup language defining a user interactive program and/or user interface, visual identifiers generated by the express menu renderer 202 may not suit a user's desires and/or preferences.

Accordingly, a user may choose to alter the visual identifier associated with a menu item. In the depicted non-limiting exemplary user interface 700a, a user may choose to alter the depicted textual identifier associated with special features menu item 710. Accordingly, a user may edit the field by selecting the non-limiting exemplary edit field 711 selectable element.

Figure 7A:
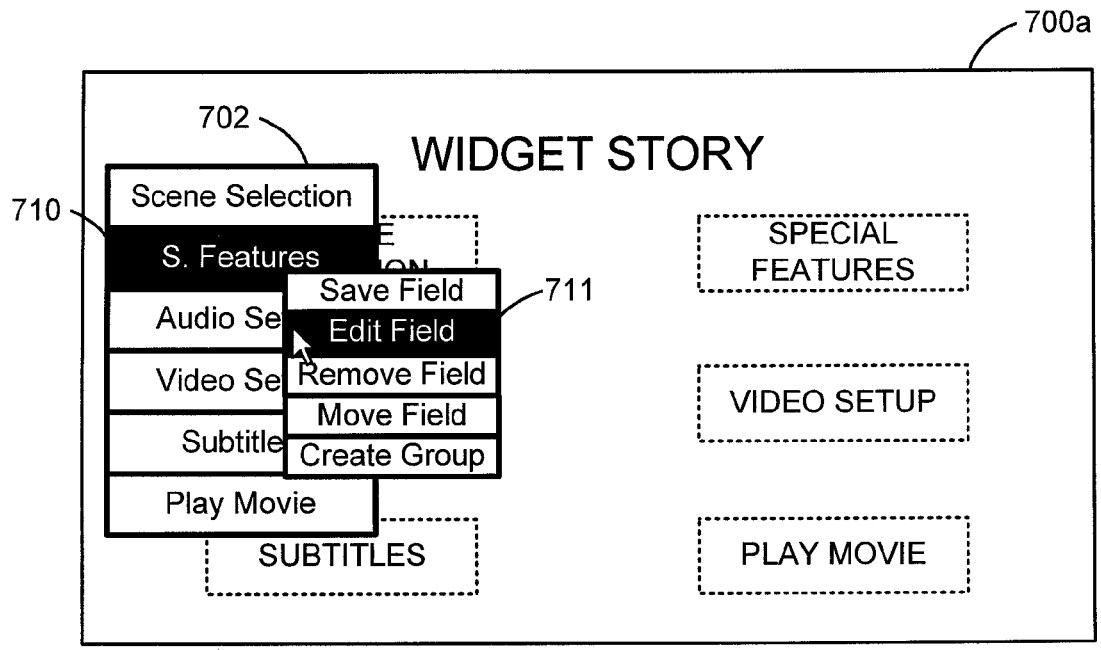
FIG. 7A depicts an alternative illustration of operation of a disc viewer in accordance with a high definition video playback system.
Figure 7B:
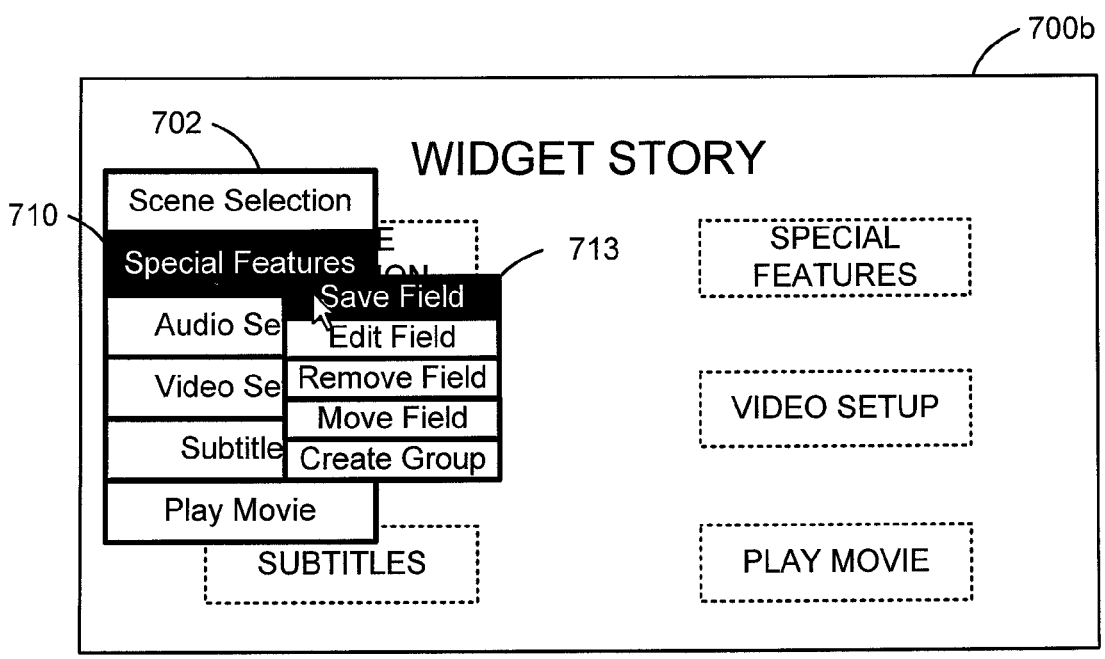
FIG. 7B depicts an alternative illustration of operation of a disc viewer in accordance with a high definition video playback system.

Reference is now made to FIG. 7B, which depicts an alternative illustration of the user interface 700a of FIG. 7A. FIG. 7B depicts a non-limiting exemplary user interface 700b upon editing by a user. In the depicted non-limiting example, a user has altered special features menu item of an express menu 702. Accordingly, a user may save the modification by selecting the non-limiting exemplary save field 713 selectable element. Such an action can cause the express menu uploader 204 (FIG. 2) to save and/or upload the user modified express menu configuration to a server or computer via a network and/or store the modified express menu configuration to mass storage or other memory accessible by the high definition playback system 100 (FIG. 1) for retrieval by the express menu renderer 202. In addition, the express menu uploader 204 may also store the express menu configuration on a high definition optical disc for later retrieval by the express menu renderer 202.

Figure 7C:
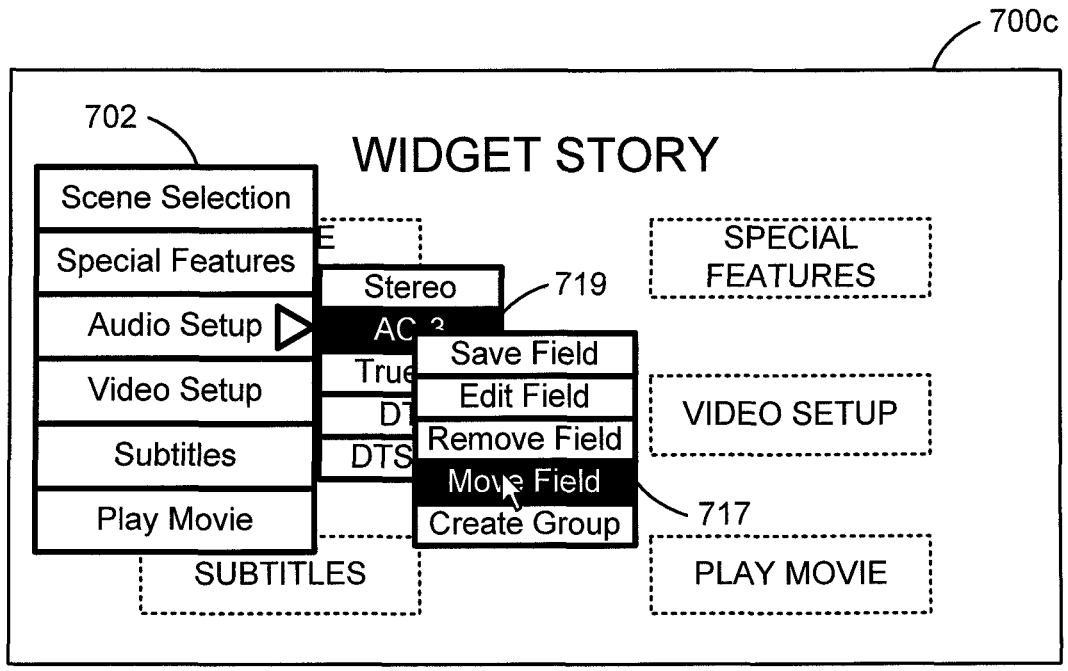
FIG. 7C depicts an alternative illustration of operation of a disc viewer in accordance with a high definition video playback system.
Figure 7D:
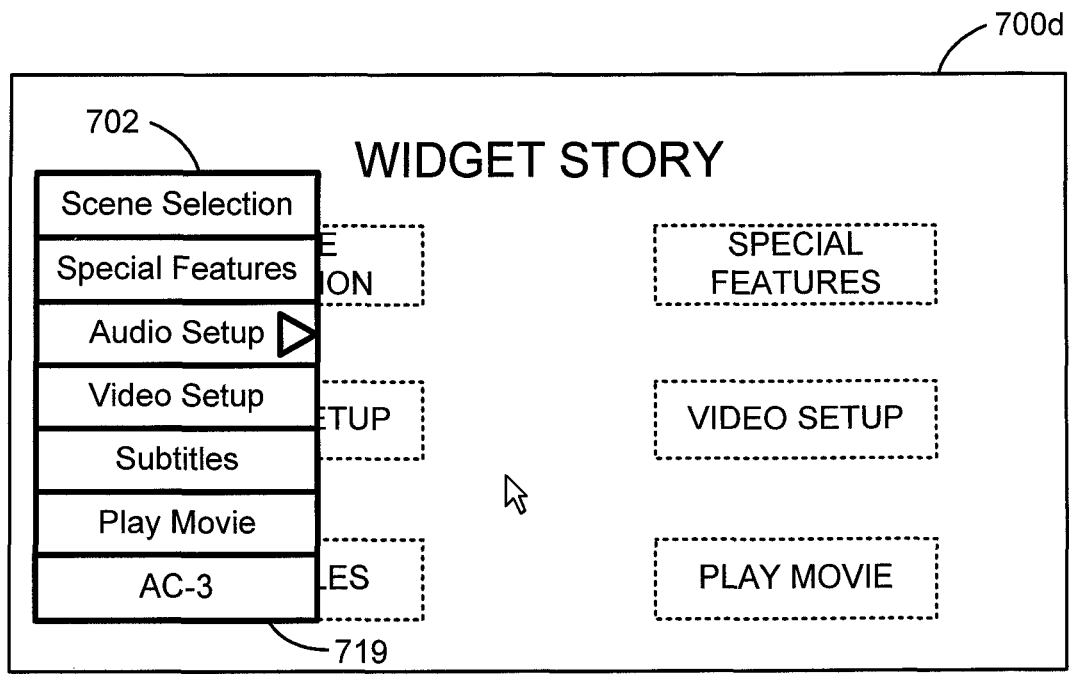
FIG. 7D depicts an alternative illustration of operation of a disc viewer in accordance with a high definition video playback system.

Reference is now made to FIG. 7C, which depicts an alternative illustration of operation of the express menu renderer 202 (FIG. 2). In the depicted user interface 700c, an express menu 702 rendered by the express menu renderer 202 and/or disc viewer 108 (FIG. 2) can be further configurable by a user. In the depicted example, an express menu, a selected menu item can be moved if move field item 717 is selected. Accordingly, the express menu renderer 702 allow a user to move an item to another location of the displayed express menu 702. As a non-limiting example, a user may move a menu item to a different location within the same menu or in different locations in submenus and/or parent menus. Additionally, the express menu renderer 202 may also provide the ability to copy and paste menu items.

In the depicted example, a user may move AC-3 element 719 to a different location in the express menu 702 by selecting move field item 717. Accordingly, reference is now made to FIG. 7D, which depicts user interface 700d. User interface 700d illustrates one non-limiting example of the above noted move item functionality employed by the express menu renderer 202 and/or disc viewer 108. In the depicted non-limiting example, a user can move the AC-3 element 719 to a parent menu 710, and the express menu renderer 202 can re-render the express menu 702 accordingly.

Figure 7E:
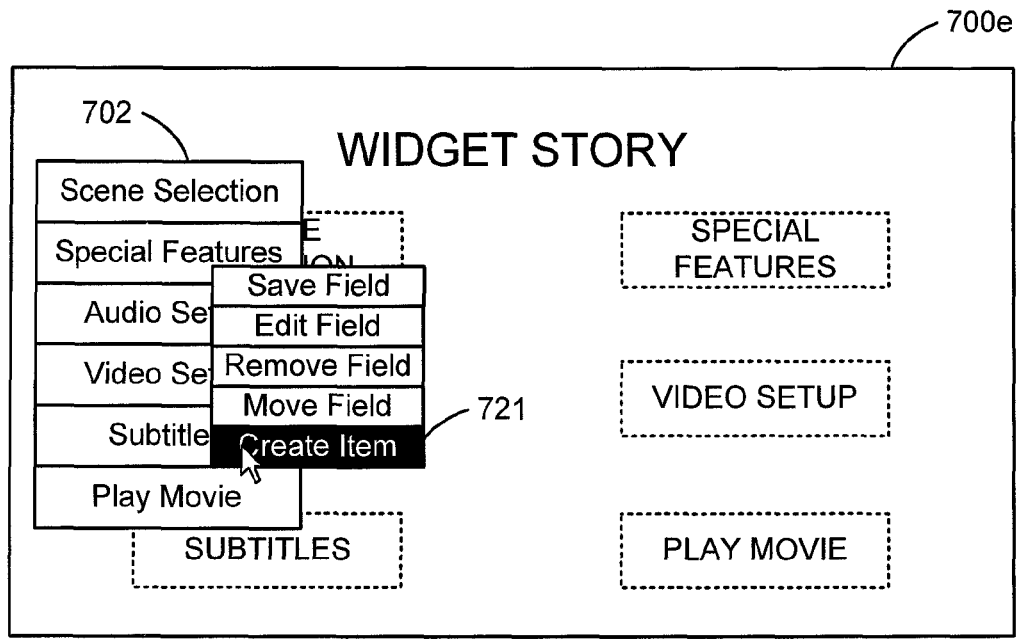
FIG. 7E depicts an alternative illustration of operation of a disc viewer in accordance with a high definition video playback system.
Figure 7F:
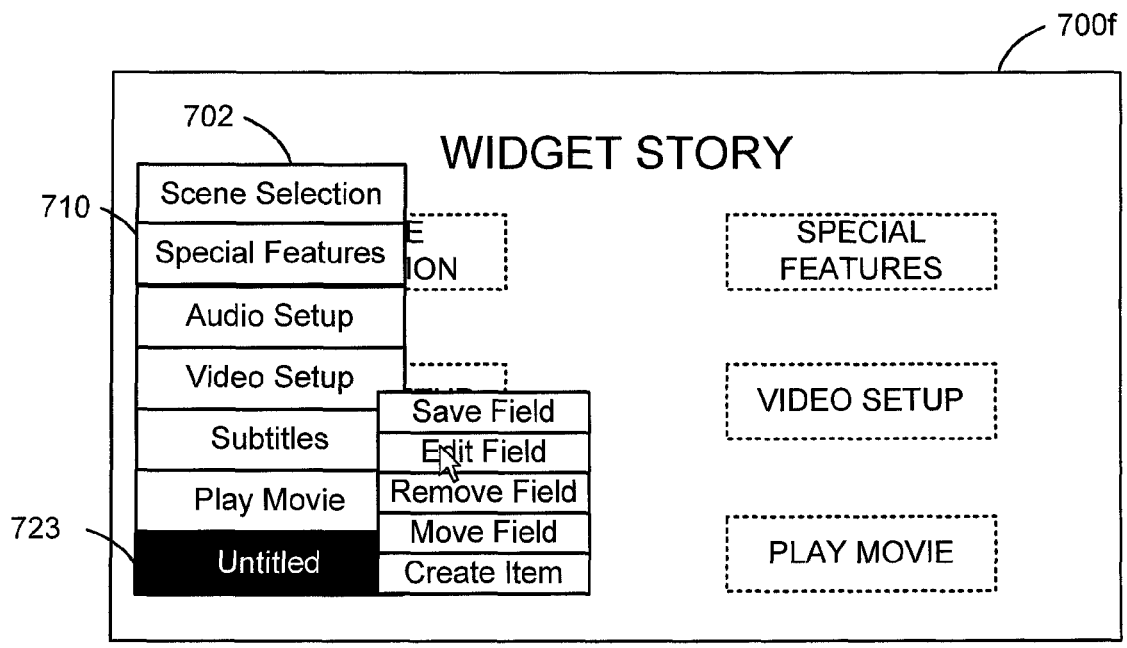
FIG. 7F depicts an alternative illustration of operation of a disc viewer in accordance with a high definition video playback system.

Reference is now made to FIG. 7E, which depicts an alternative illustration of operation of the express menu renderer 202 (FIG. 2). In the depicted user interface 700e, a user may select create item 721, which can allow a user to create a menu item that can be rendered in the express menu 702. In this way, the disc viewer 108 (FIG. 2) and express menu renderer 202 can facilitate further customization of an express menu 702 within a user interface 700e that is generated by the disc viewer 108 and renderer 202 by allowing a user to create customized menu hierarchies and/or groups containing various menu items desired by the user. In other words, the express menu renderer 202 can allow a user to create a user defined menu hierarchy containing selectable elements corresponding to selectable elements within the user interface 700e.

In the depicted example, a user may create a menu item by selecting create item 721. Accordingly, reference is now made to FIG. 7F, which depicts user interface 700f, which includes a user created menu item 723. A user created menu item 723 can include a menu item that triggers events or execution of event handlers defined by the user interface 700f of a high definition disc. Alternatively, the user created menu item 723 can include a group of various menu items. In other words, the user created menu item 723 can include a folder that stores other menu items and/or subfolders.

With reference to the above exemplary user interfaces, it should again be noted that the above examples are merely exemplary, and that various user interfaces can be defined by a user interactive program accompanying high definition video on a high definition optical disc. Various user interface elements, including images, buttons, menus, video and other elements can be defined by a user interactive program and be responsive to various events caused by a user via event handlers. In addition, user interfaces defined by a user interactive program can define various responses, events and/or event handlers to any input on a keyboard, remote control or any input device.

Figure 8:
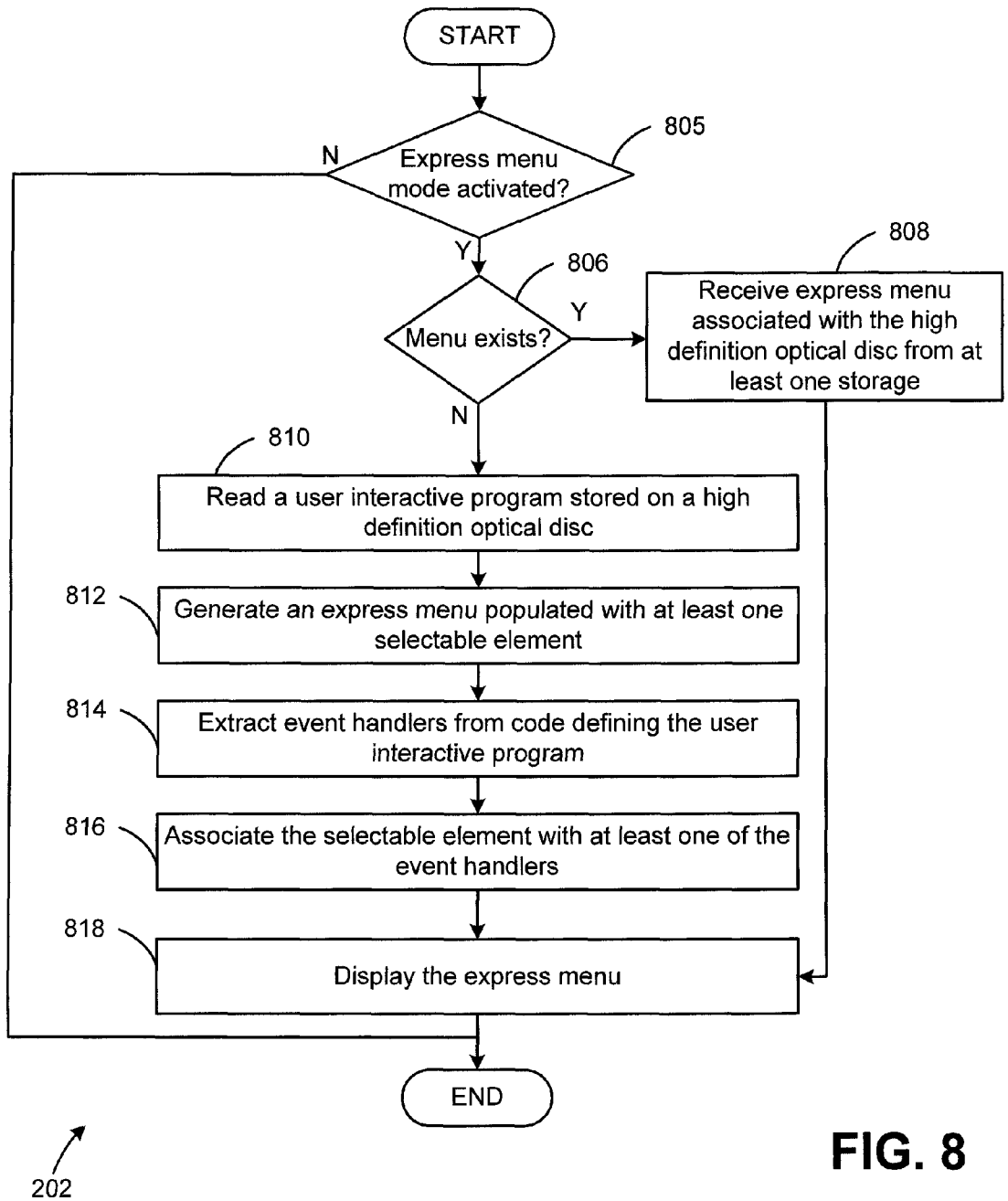
FIG. 8 depicts a flowchart illustrating operation of an express menu renderer in accordance with the disclosure.

Reference is now made to FIG. 8, which depicts one example of the execution of the express menu renderer 202 (FIG. 2). The flow chart may also be viewed as depicting a method in accordance with the disclosure. First, in box 805, it is determined whether an express menu mode is activated. If an express menu mode is activated by a user, then an express menu should be rendered. Accordingly, in box 806, it is determined whether an express menu configuration can be downloaded, retrieved, and/or received by the express menu receiver 206 in box 808.

If an express menu cannot be downloaded, retrieved, and/or received, then in box 810, the express menu renderer 202 can read and/or execute a user interactive program stored on the high definition optical disc. In box 812, an express menu can be generated and populated with at least one selectable element. In box 814, event handlers can be extracted from code and/or markup language defining a user interface and/or user interactive program. Next, in box 816, event handlers extracted from the user interface can be associated with selectable elements of a generated express menu. Next, in box 818, the express menu can be displayed for interaction with a user.

Figure 9:
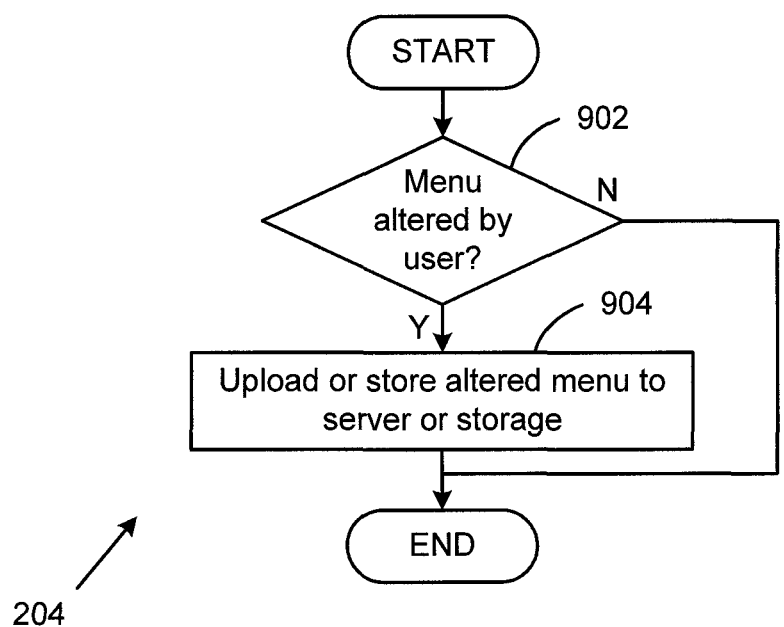
FIG. 9 depicts a flowchart illustrating operation of an express menu uploader in accordance with the disclosure.

Reference is now made to FIG. 9, which depicts one example of the execution of the express menu uploader 204 (FIG. 2). The flow chart may also be viewed as depicting a method in accordance with the disclosure. First, in box 902, it is determined whether a user has altered an express menu overlaid onto a user interface. Then, in box 904, the altered express menu configuration is uploaded to a server, computer or other high definition playback system 100 (FIG. 1). In addition, the altered express menu configuration can also be stored on mass storage or other memory of a high definition playback system as well as on a high definition optical disc.

Although the functionality of various components are described above with respect to FIGS. 1-9 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally appreciated by those skilled in the art and, consequently, are not described in detail herein.

The flow charts of FIGS. 8-9 show the functionality and operation of an implementation of the high definition video playback system 100 and systems therein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIG. 8-9 show a specific order of execution, it is understood that the order of execution may differ from that which is depicted. For example, the order of execution of two or more blocks may be scrambled relative to the order shown. Also, two or more blocks shown in succession in FIGS. 8-9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for generating an express menu from a high definition optical disc in a high definition playback system, the high definition optical disc storing an original menu populated with a plurality of user interface elements in a user interface, the method comprising:
    reading a user interactive program stored on the high definition optical disc, the user interactive program defining the user interface and the original menu;
    extracting a plurality of event handlers from code defining the user interactive program, the event handlers associated with the user interface elements of the original menu;
    associating at least one selectable element with at least one event handler;
    generating the express menu according to the original menu associated with the high definition optical disc, the express menu populated with the at least one selectable element; and
    displaying both the original menu and the express menu, the express menu comprising all of the same selectable elements as the original menu, wherein the express menu is responsive to an input device other than an input device used to interact with the original menu.

2. The method of claim 1, wherein the express menu is overlaid on the original menu.

3. The method of claim 1, further comprising executing the event handler corresponding to the selectable element upon selection of the selectable element.

4. The method of claim 1, wherein the saving step further comprises:
    locating identifying data associated with the high definition optical disc; and
    saving the express menu with the identifying data, wherein the identifying data is at least one of: a movie title, a tagline, a year of release, a genre, a cast, a director, chapter information, title information, video attributes, audio attributes, and disc attributes.

5. The method of claim 4, further comprises:
    determining the identifying data within the express menu in a storage corresponding to the high definition optical disc; and
    retrieving the express menu associated with the high definition optical disc from the storage.

6. The method of claim 1, wherein the express menu is responsive to at least one of: a mouse and a pointing device.

7. The method of claim 1, further comprising each of:
    assigning a corresponding visual identifier to the selectable element;
    arranging a corresponding relative location of the selectable element in the express menu; and
    arranging a predetermined location of the express menu.

8. The method of claim 7, wherein the corresponding visual identifier is at least one of:
    a textual label extracted from code defining the event handlers in the user interactive program; and
    a graphical label generated from at least one image associated with the event handlers as defined by the user interactive program, wherein the textual label and the graphical label are modifiable by a user.

9. The method of claim 1, further comprising uploading the express menu to a server configured to receive the express menu associated with the high definition optical disc.

10. The method of claim 1, wherein the generating step further comprises at least one of:
    generating a new selectable element;
    generating a folder containing at least one selectable element; and
    generating a sub-folder contained by the folder.

11. The method of claim 1, further comprising the step of disabling at least one of the selectable elements during playback of a portion of the high definition optical disc if the user interactive program does not allow execution of a corresponding event handler during the portion of the high definition optical disc.

12. A system for generating an express menu from a high definition optical disc in a high definition playback system, the high definition optical disc storing an original menu populated with a plurality of user interface elements in a user interface responsive to a keyboard or remote control, the system comprising:
    a disc viewer configured to read a user interactive program stored on the high definition optical disc, the user interactive program defining the user interface and the original menu for user interaction;
    an extracting module configured to extract a plurality of event handlers from code defining the user interactive program, the event handlers associated with the user interface elements of the original menu;
    an express menu renderer configured to generate the express menu according to the original menu associated with the high definition optical disc, the express menu generated having at least one selectable element associated with at least one of the event handlers, the express menu renderer further configured to display both the original menu and the express menu, the express menu comprising all of the same selectable elements as the original menu;
    wherein, the express menu is responsive to an input device other than an input device used to interact with the original menu.

13. The system of claim 12, wherein the express menu is overlaid on the original menu.

14. The system of claim 12, further comprising:
    a menu uploader configured to upload the express menu to a server configured to receive the express menu associated with the high definition optical disc; and
    a menu receiver configured to receive the express menu associated with the high definition optical disc from a storage.

15. The system of claim 14, wherein the express menu renderer further comprises a searching module configured to search identifying data associated with the high definition optical disc, wherein the identifying data is at least one of: a movie title, a tagline, a year of release, a genre, cast, director, chapter information, title information, video attributes, audio attributes, and disc attribute.

16. The system of claim 15, wherein the express menu renderer is further configured to:
associate the express menu with the identifying data; and
save the express menu with the identifying data.

17. The system of claim 16, wherein the menu receiver is further configured to determine the identifying data within the express menu in the storage corresponding to the high definition optical disc.

18. The system of claim 12, wherein the express menu renderer further comprises an editing module configured to edit the express menu and the selectable element of the express menu.

19. The system of claim 18, wherein the editing module is further configured to perform each of:
designate at least one of event handlers to the selectable element;
assign a corresponding visual identifier to the selectable element;
arrange a corresponding relative location of the selectable element in the express menu; and
arrange a predetermined location of the express menu.

20. The system of claim 19, wherein the corresponding visual identifier is at least one of:
a textual label extracted from code defining the event handlers in the user interactive program; and
a graphical label generated from at least one image associated with the event handlers as defined by the user interactive program, wherein the textual label and the graphical label are modifiable by a user.

21. The system of claim 12, wherein the express menu renderer further executes the event handler corresponding to the selectable element upon selection of the selectable element.

22. The system of claim 12, wherein the express menu renderer is further configured to generate at least one of a new selectable element and a folder containing at least one selectable element.

23. The system of claim 12, wherein the express menu renderer is further configured to disable at least one of the selectable elements during playback of a portion of the high definition optical disc if the user interactive program does not allow execution of a corresponding event handler during the portion of the high definition optical disc.

24. A non-transitory computer-readable medium having a computer program for generating an express menu from a high definition optical disc in a high definition video playback system, the high definition optical disc storing an original menu populated with a plurality of user interface elements in a user interface responsive to a keyboard or remote control, the medium comprising:
logic for reading a user interactive program stored on the high definition optical disc, the user interactive program defining the user interface and the original menu;
logic for extracting a plurality of event handlers from code defining the user interactive program, the event handlers associated with the user interface elements of the original menu;
logic for associating at least one selectable element with at least one event handler;
logic for generating the express menu according to the original menu associated with the high definition optical disc, the express menu populated with the at least one selectable element; and
logic for displaying both the original menu and the express menu, the express menu comprising all of the same selectable elements as the original menu, wherein the express menu is responsive to an input device other than an input device used to interact with the original menu.

25. The computer readable medium of claim 24, further comprising logic for receiving the express menu associated with the high definition optical disc from at least one storage.

26. The computer readable medium of claim 24, further comprising logic for editing the express menu.

27. The computer readable medium of claim 24, further comprising logic for uploading the express menu to a server configured to receive the express menu associated with the high definition optical disc.

* * * * *